United States Patent [19]
Darcie

[11] Patent Number: 4,701,904
[45] Date of Patent: Oct. 20, 1987

[54] OPTICAL LOCAL AREA NETWORK EMPLOYING MICROWAVE MODULATION TECHNIQUES

[75] Inventor: Thomas E. Darcie, Hazlet, N.J.

[73] Assignee: American Telephone and Telegraph Company, AT&T Bell Laboratories, Murray Hill, N.J.

[21] Appl. No.: 788,953

[22] Filed: Oct. 18, 1985

[51] Int. Cl.$^4$ ............................ H04B 9/00; H04J 1/10
[52] U.S. Cl. ............................................ 370/3; 455/607
[58] Field of Search ...................... 370/1, 3, 71, 72, 73; 455/607, 612, 617, 45; 358/86

[56] References Cited

U.S. PATENT DOCUMENTS

| | | | |
|---|---|---|---|
| 2,506,672 | 5/1950 | Kell et al. | 370/3 |
| 4,135,202 | 1/1979 | Cutler | 370/3 |
| 4,366,565 | 12/1982 | Herskowitz | 370/1 |
| 4,441,180 | 3/1984 | Schussler | 370/3 |
| 4,630,256 | 12/1986 | Albanese | 370/3 |

OTHER PUBLICATIONS

Globecom '82, Nov. 29-Dec. 2, 1982, Miami, Florida, Hubbard et al., pp. D6.6.1-D6.2.2.
Telecomm., vol. 17, No. 9, Sep. 1983, Fridman, pp. 94-96, 104-108, 128.
Telephony, Apr. 15, 1985, Beardsley et al., pp. 53, 56, 60, 62, 64.
Proc. of SPIE, vol. 434, Aug. 25, 1983, San Diego, Calif., Fiber Optics in Local Networks, pp. 20-22.

Primary Examiner—Benedict V. Safourek
Attorney, Agent, or Firm—Erwin W. Pfeifle

[57] ABSTRACT

The present invention relates to an optical communication system wherein the entire microwave frequency bandwidth of the optical source-to-detector system is subdivided into a plurality of non-overlapping frequency bands or channels, and each user transmits and/or receives information either (a) on a separate fixed one of the channels, (b) on a free channel selectively assigned via control signals transmitted on a separate control channel at the time of initiation of a communication, or (c) on a channel randomly selected at the receiver by an associated user to receive a particular program. The present optical communication system can be configured to simultaneously broadcast multiple programs over separate channels for random selection by each user, or to achieve local and/or external two-way communications with the associated system users.

7 Claims, 9 Drawing Figures

OPTICAL LOCAL AREA NETWORK EMPLOYING MICROWAVE MODULATION TECHNIQUES

TECHNICAL FIELD

The present invention relates to an optical communication arrangement and, more particularly, to an optical communication arrangement which can be used, for example, in a Local Area Network (LAN) wherein the entire microwave frequency bandwidth of the optical source-to-detector system is subdivided into separate non-overlapping frequency band channels and each user transmits and/or receives information either (a) on a separate fixed predetermined channel, (b) on a free channel selectively assigned using control signals transmitted on a control channel used by all transmitters and/or receivers, or (c) on a channel selectively chosen at a receiver associated with a user.

DESCRIPTION OF THE PRIOR ART

Semiconductor lasers and light emitting diodes (LEDs) can be modulated by direct current injection to provide an optical power output which is linearly proportional to the modulating current. An optical fiber can guide such modulated optical signal over many tens of kilometers with little distortion and complete noise immunity. Additionally, high speed photodetectors have excellent linearity and can be used at the receiver to reproduce an original information signal used for modulating the transmitter semiconductor laser or LED.

Lightwave information communication systems have taken many forms such as ring configurations used in Local Area Networks (LANs). For example, in the article "On Survivable Rings" by A. Beardsley et al in Telephony, Apr. 15, 1985 at pages 53, 56, 60, 62 and 64 the single-link n-nodes, star-shaped, and dual ring configurations were presented and discussed. Additionally, in LANs, various multiplexing and modulation techniques have been used to transmit information from each of the users to other users of the network without interference. One multiplexing technique commonly used is time division multiplexing of the packets of information from active users onto the optical bus. In such systems, either a central resource allocation device recognizes a service request from a user and assigns a free time slot to that user, or contention devices check activity in each time slot period and when a time slot is found free, the packet of information from the associated user is inserted into that time slot. In this regard see, for example, the article "The Experimental Broadband Network" by W. M. Hubbard et al. in Globecom '82, Nov. 29–Dec. 2, 1982, Miami, Fla. at pages D6.2.1–D6.2.2. Angular division multiplexing has been disclosed in, for example, U.S. Pat. No. 4,366,565 issued to G. J. Herskowitz on Dec. 28, 1982, for parallel optical signal transmission over a multimode optical fiber. Modulation techniques have included the use of, for example, spread spectrum coding to reject interference as disclosed, for example, in the article "Fiber Optic Bus With Spread Spectrum Techniques" by P. Pfeiffer et al. in Proceedings of SPIE, Fiber Optics in Local Area Networks, Vol. 434, Aug. 25, 1983, San Diego, Calif., at pages 20–23.

Prior art lightwave systems usually are found using baseband transmissions and, therefore, do not generally use all of the possible bandwidth available to the system. The problem in the prior art is to provide a simple lightwave communication system which provide maximum use of the available frequency spectrum while avoiding contention problems for multiple users of the system.

SUMMARY OF THE INVENTION

The foregoing problem in the prior art has been solved in accordance with the present invention which relates to a lightwave communication system which uses microwave modulation techniques to permit multiple simultaneous transmissions over the system in separate frequency band channels.

It is an aspect of the present invention to provide an optical communication system which can be used in, for example, a Local Area Network (LAN) wherein each user transmits and/or receives digital or analog information which has been used to intensity modulate an optical source so as to produce a signal occupying a separate predetermined frequency band of the overall frequency spectrum of the optical system. More particularly, in the present optical communication arrangement, the entire microwave frequency bandwidth of the optical source-to-detector system is subdivided into separate frequency channels and each user transmits and/or receives information either (a) on a separate fixed predetermined channel, (b) on a free channel selectively assigned via a head-end unit using control signals transmitted on a control channel used by all users, or (c) on a channel selectively chosen at a receiver associated with a user.

Other and further aspects of the present invention will become apparent during the course of the following description and by reference to the accompanying drawings.

BRIEF DESCRIPTION OF THE DRAWINGS

Referring now to the drawings in which like numerals represent like parts in the several views.

DETAILED DESCRIPTION

Figure 9:
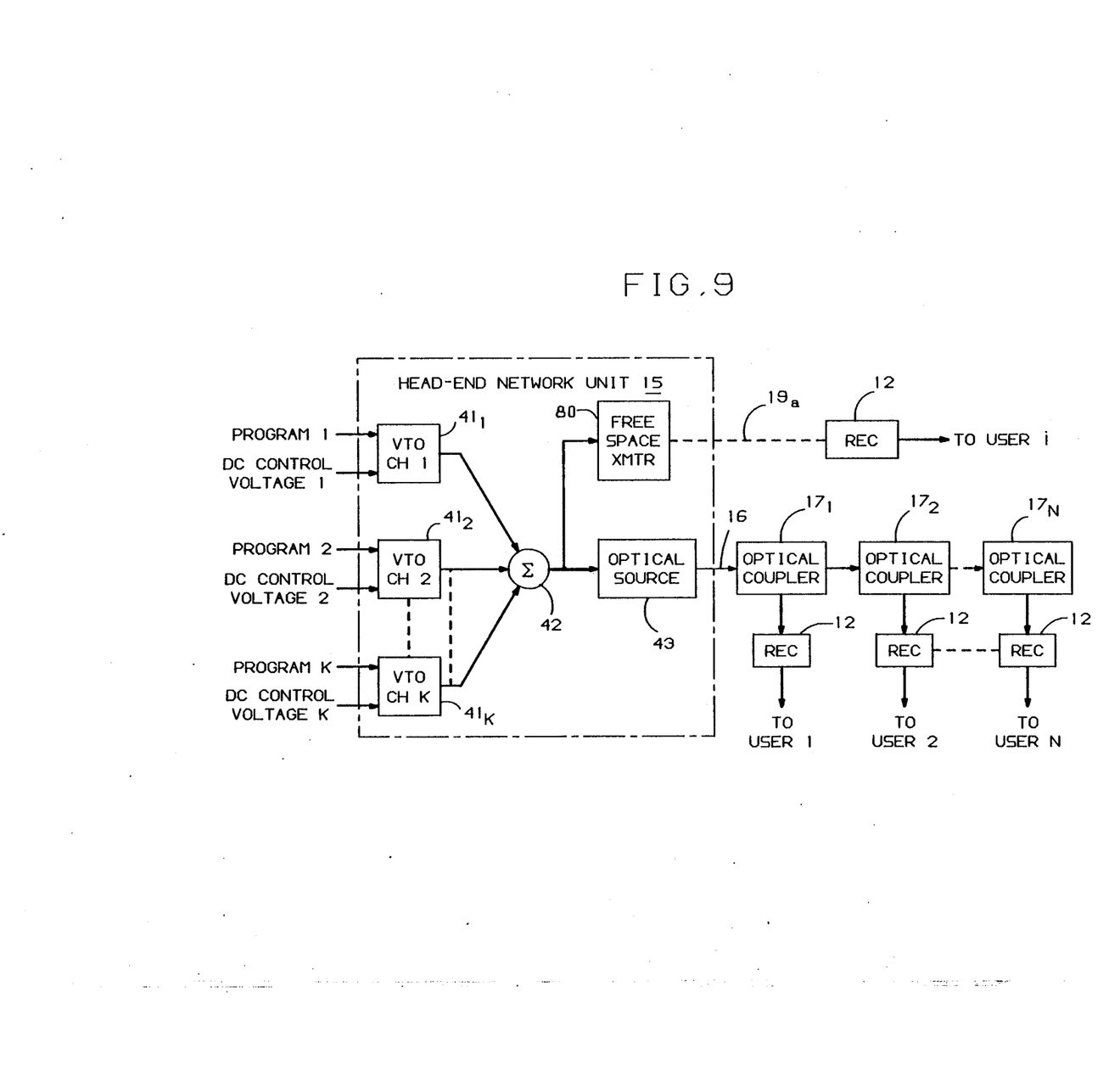
FIG. 9 is a block diagram of a broadcast optical communication system where each user can selectively receive any one of K multiple channel broadcasts.

The description which follows is directed to an optical fiber communication system. However, it is to be understood that any reference to an optical fiber can equally be directed to the use of a free-space optical transmission system or some combination thereof as shown in FIGS. 1 and 9.

Figure 1:
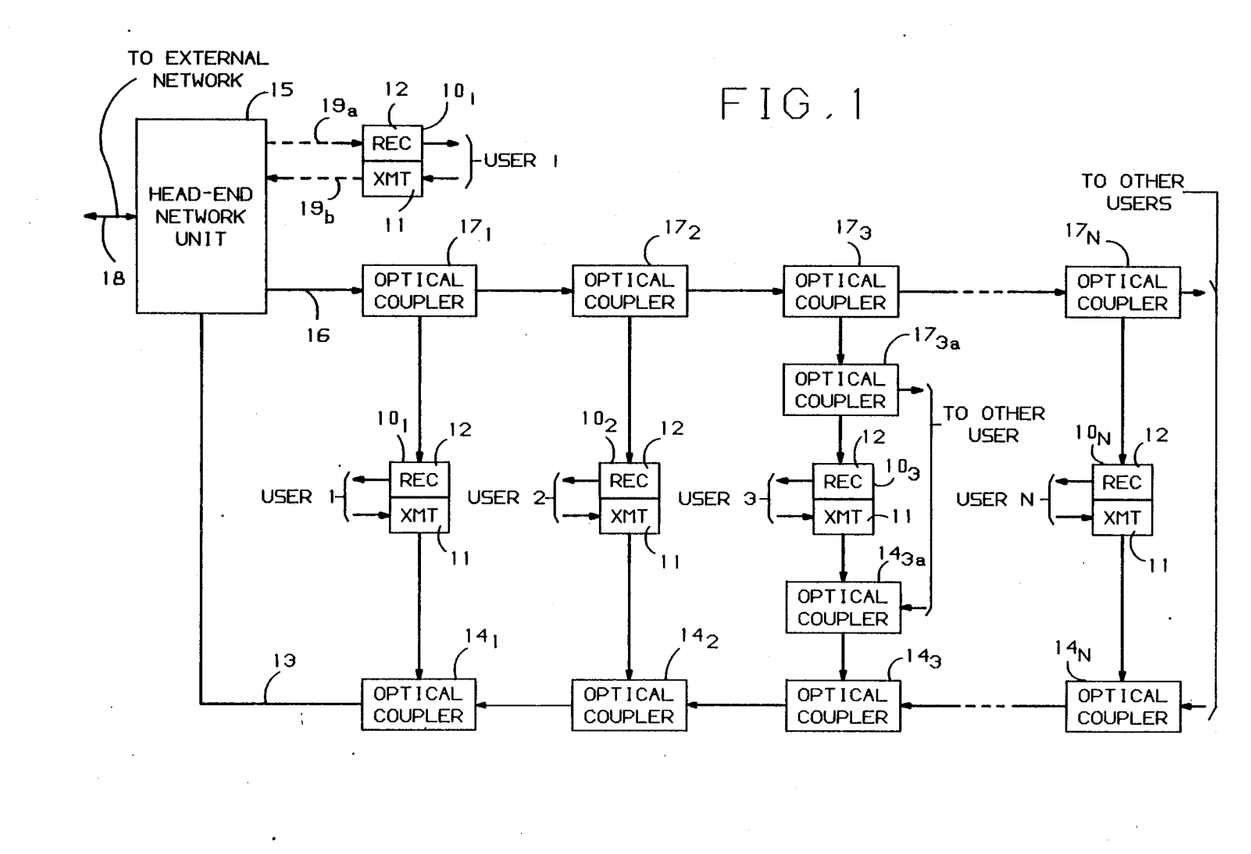
FIG. 1 is a block diagram of an exemplary arrangement of a lightwave communication system according to the present invention.

FIG. 1 is a block diagram of an exemplary arrangement of a lightwave communication system in accordance with the present invention which permits each of a plurality of N users of the system to communicate with one another or with other persons or devices reachable via a communications network external to the present system. Alternatively, the present lightwave communication system could be used for broadcasting many channels of information to each user or subscriber, with the individual users selecting which channel they wish to receive information from.

Figure 2:
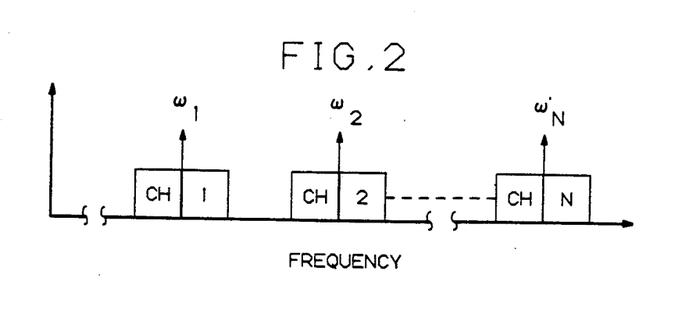
FIG. 2 is a chart of a typical channel layout for use by the transceivers of FIG. 1.

In the arrangement of FIG. 1, each of users 1–N has associated therewith a separate transceiver $10_1$ to $10_N$, respectively, with each transceiver $10_i$ comprising a transmitter 11 and a receiver 12. In the present arrangement, the entire microwave frequency bandwidth of the optical source-to-detector system is divided into a plurality of, for example, N separate channels as shown in FIG. 2. In one embodiment of the present invention, each of transceivers $10_1$ to $10_N$ is fixedly assigned to a separate one of the N channels, which configuration reduces the complexity of each transceiver. It is to be understood that the present invention can also include alternative embodiments wherein each of (a) transmitters 11 of transceivers $10_1$ to $10_N$, and/or (b) receivers 12 of the transceivers, can be selectively assigned to any one of the N channels. In the alternative embodiment (a) above, each transmitter 11 can be directed to a free channel via either (a) control signals from a central network unit or (b) the use of any suitable known contention resolution technique for determining an inactive channel. This latter embodiment, however, increases the cost and complexity of each transceiver since each transceiver must be capable of generating all of the possible carriers of the N channels either selectively, at each transceiver, or automatically in response to control signals from either the central network unit or from included contention resolution means.

In the arrangement of FIG. 1, transmitters 11 of transceivers $10_1$ to $10_N$ have their outputs connected to an optical fiber 13 via directional optical couplers $14_1$ to $14_N$, respectively. Each of the optical couplers $14_i$ is arranged to couple the information signals from the associated user transmitter 11 into fiber 13 for propagation in the same direction as the information signals coupled into fiber 13 by all other users, which information signals are directed towards an optional head-end network unit 15. Optional head-end network unit 15, when present, functions to gate the signal from each of transmitters 11 received on fiber 13 in the separate channels to either (a) an optical fiber 16, for any local calls within the system, or (b) to the external communications network, after performing any necessary processing as will be explained in greater detail hereinafter. When head-end unit 15 is not present, then the signals on optical fiber 13 are directly connected to optical fiber 16. The output signals from head-end network unit 15, propagating on fiber 16, are directed towards receivers 12 of transceivers $10_1$ to $10_N$ by optical couplers $17_1$ to $17_N$, respectively. Receivers 12 function to demodulate only those signals received in the channel associated with its transceiver and reject the signals in all other channels. The output signal from each receiver 12 is then provided to the associated user. It is to be understood that the linear arrangement of optical fibers 13 and 16 shown in FIG. 1, and the alternative arrangement of FIG. 9 to be explained hereinafter, is only provided for simplicity of explanation of the present communication system. It is to be further understood that in actuality fibers 13 and 16 most probably would include, for example, combiners or dividers, respectively, to provide optional paths in an arbitrary tree type distribution system with each path including one or more optical couplers as shown, for example, in FIG. 1 for user 3. Such tree type distribution system would ease the routing of optical fibers 13 and 16 in, for example, a building or amongst buildings, if necessary. Alternatively, certain of the users could be supplied the output signal from head-end network unit 15 via a free space optical link $19_a$, and head-end unit 15 could receive transmissions from such user via free space optical link $19_b$. For a user using such free space optical link, the transmitter 11 and receiver 12 could transmit and receive the optical signal directly to and from head-end network unit 15. For this reason, optical couplers $14_3$ and $17_3$ associated with user 3 is only needed when such user connects to optical fibers 13 and 16, respectively.

Figure 3:
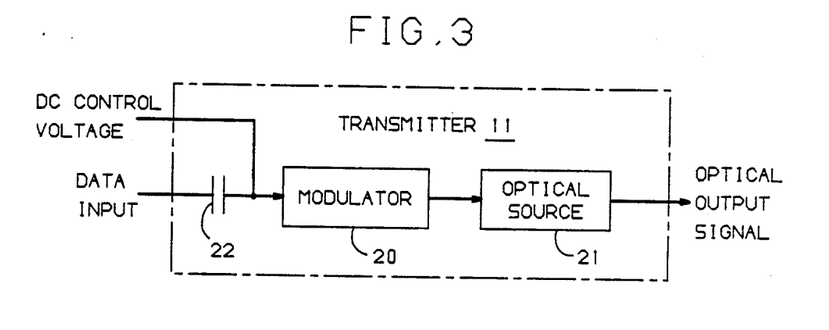
FIG. 3 is a block diagram of an exemplary transmitter for a user of the system of FIG. 1 where a separate channel is fixedly assigned to each transceiver.

FIG. 3 is a block diagram of an exemplary transmitter 11 for use in the hereinbefore mentioned preferred embodiment where each of transceivers $10_1$ to $10_N$ is permanently assigned a separate one of the channels 1–N shown in FIG. 2. In operation, a modulator 20 which can comprise any suitable modulator but hereinafter will be considered as using a voltage tuned oscillator (VTO) 20, is responsive to a DC control voltage applied at its input to generate a particular carrier frequency $\omega_i$. It is to be understood that by changing the value of the DC voltage applied to a VTO 20, a corresponding change in the output frequency is obtained as is well known in the art. The different value of DC control voltage needed for each VTO 20 of transceivers $10_1$ to $10_N$ to generate the associated assigned carrier frequency can be obtained either from separate DC sources, from a central DC source or from some combination of sources, depending on the location of each of the transceivers and the users of the system.

Concurrently, a digital data or information input signal from an associated user is also applied, via a capacitance 22, to the input of VTO 20 to, for example, Frequency Modulate (FM) the assigned carrier frequency $\omega_i$ and transmit the digital data or information signal in the channel designated by the carrier frequency $\omega_i$. For example, it will be assumed that transmitter 11 of transceiver $10_1$ has applied to it a DC control voltage of a value which will generate the carrier frequency $\omega_1$ in associated VTO 20; transmitter 11 of transceiver $10_2$ has applied to it a DC control voltage of a value which will generate the carrier frequency $\omega_2$ in associated VTO 20; and transmitter 11 of transceiver $10_N$ has applied to it a DC control voltage of a value which will generate the carrier frequency $\omega_N$ in associated VTO 20. The output signal from VTO 20 is used to directly modulate an optical source 21, which can be, for example, a semiconductor laser diode or any other suitable lasing means, an LED, or the output signal can be used to drive an external light intensity modulator like a Lithium Niobate electro-optic modulator or Multiple Quantum Well modulator. As a result, optical source 21 is intensity modulated at the assigned microwave channel frequencies received from the associated VTO 20. The optical output signal from optical source 21 is transmitted over an optical link to the associated optical coupler $14_i$ for transmission to head-end network unit 15 via fiber 13.

Figure 4:
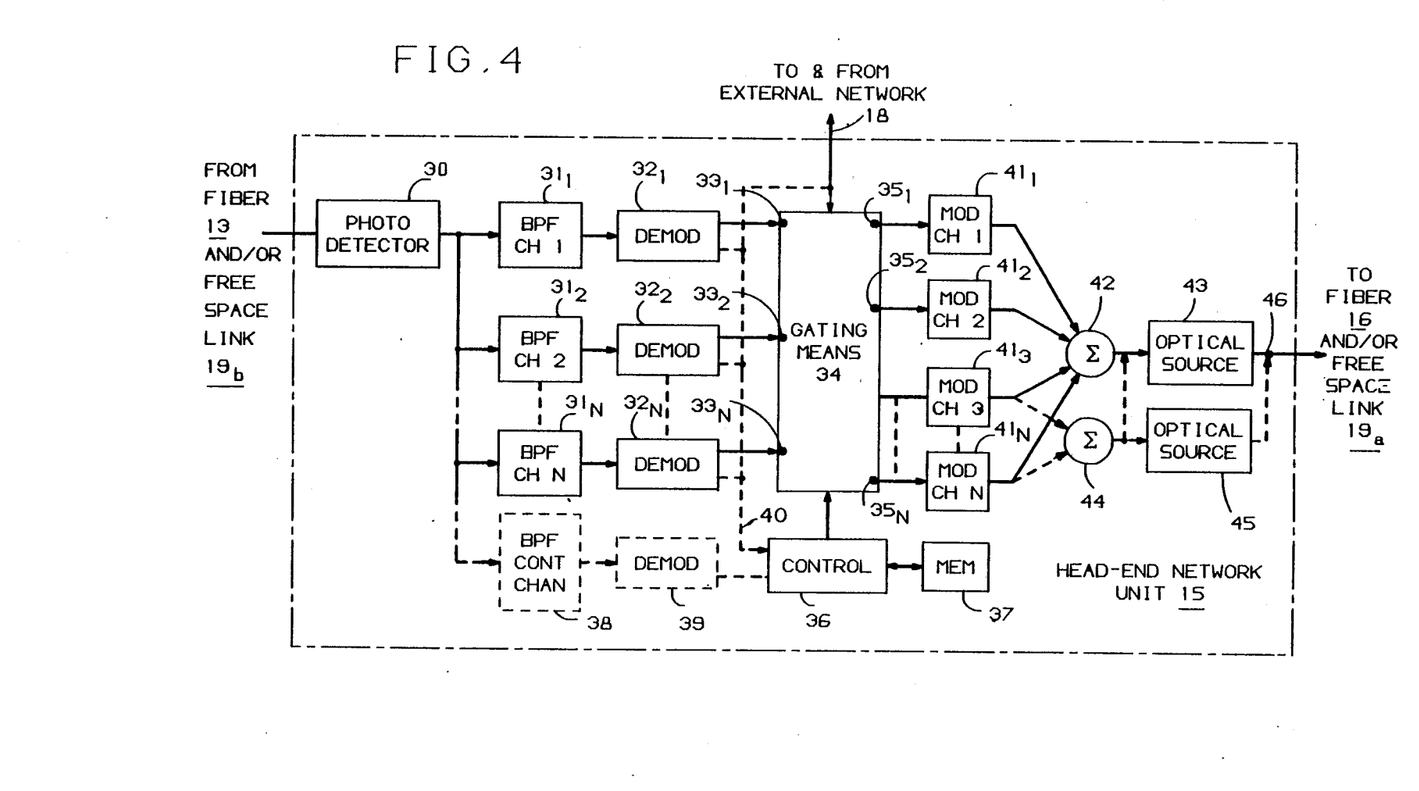
FIG. 4 is an exemplary arrangement of a head-end network unit for use in the system of FIG. 1.

For the embodiment where each of transceivers $10_1$ to $10_N$ is assigned a separate fixed carrier frequency $\omega_i$, head-end network unit 15 functions to (a) receive each active channel frequency band, (b) determine where each channel is to be transmitted (to another local user to to the external network), (c) convert the received channel frequencies (1) to a proper channel frequency of a destined local user of the system or (2) to, for example, a baseband digital signal of the external network, and (d) gate such signal to optical fiber 16 for transmission to a destined local user, or to guiding means 18 for transmission over the external network. An exemplary arrangement of head-end network unit 15 for this embodiment is shown in FIG. 4. There, the multiple channel signals on fiber 13 are received by a photodetector 30 which functions to convert the lightwave signals on fiber 13 into corresponding electrical signals.

The multiple electrical channel signals at the microwave frequencies are concurrently transmitted to a bank of N channel filters $31_1$ to $31_N$. Each filter $31_i$ functions to pass only the signal within the separate associated channel frequency band and reject all others. For example, filter $31_1$ passes only the frequency band associated with channel 1 associated with exemplary transceiver $10_1$; filter $31_2$ passes only the frequency band associated with channel 2 associated with exemplary transceiver $10_2$; and filter $31_N$ passes only the frequency band associated with channel N associated with exemplary transceiver $10_N$. The outputs from filters $31_1$ to $31_N$ are transmitted to demodulators $32_1$ to $32_N$, respectively. Each of demodulators $32_1$ to $32_N$ functions to convert the microwave electrical signals of the particular frequency band passed by the associated filter $31_i$ into a baseband digital signal. Demodulators are well known in the art and any suitable arrangement such as a Phase Lock Loop or, for an FSK modulated signal, a limiter-discriminator can be used for the demodulators 31 of FIG. 4. The output signals from demodulators $32_1$ to $32_N$ are terminated at separate inputs $33_1$ to $33_N$, respectively of a gating (or switching) means 34.

Figure 5:
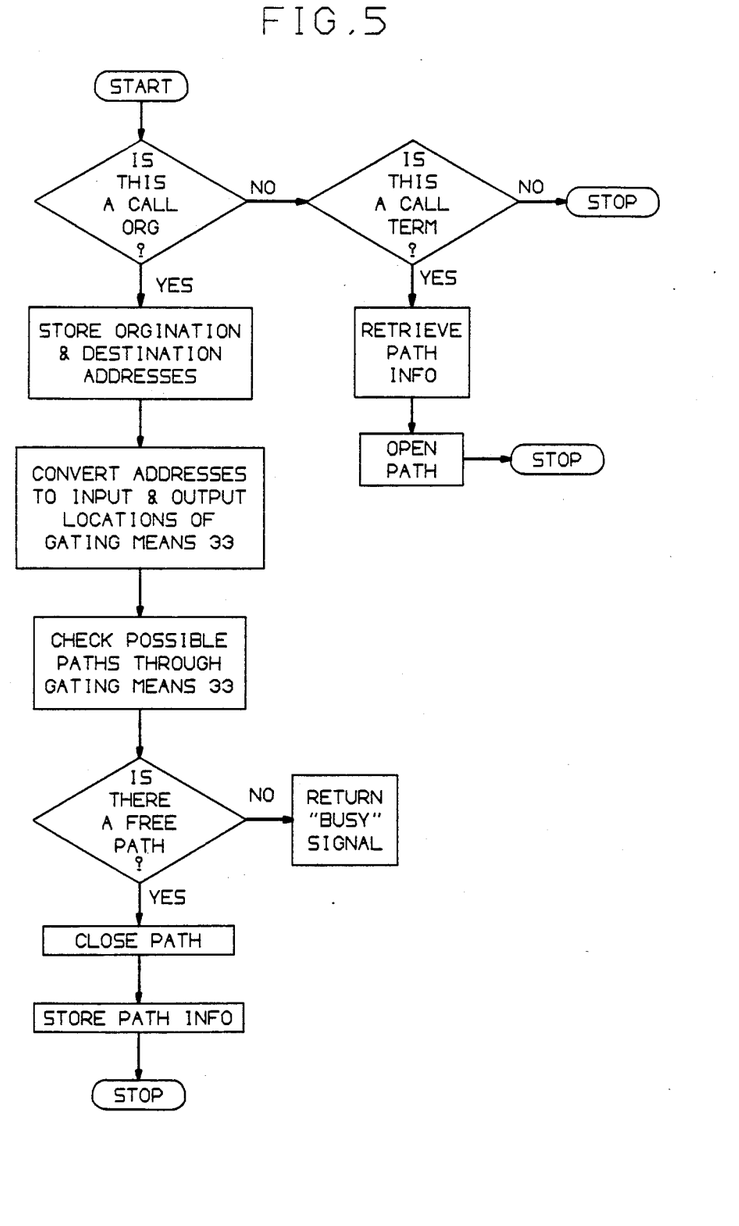
FIG. 5 is a flow chart of a typical sequence used by controller 36 of the head-end network unit of FIG. 4.

Gating means 34 functions to interconnect (a) any of inputs $33_1$ to $33_N$ to either the external network via guiding means 18 or to outputs $35_1$ to $35_N$, and (b) the external network to any one of outputs $35_1$ to $35_N$, in response to appropriate control signals from a controller 36. Controller 36 includes a memory 37 which stores the program and scratch pad memory for (a) keeping track of existing cross-connections, (b) finding appropriate paths through gating means 34, and (c) closing paths through gating means 34 when a call is initiated or opening paths when a call is terminated, as is well known in the art. Controller 36 can comprise a microprocessor or computing means which receives origination and destination addresses at the start of a call and, as shown in the flow diagram of FIG. 5, sequences through memory 37 for inactive paths from the appropriate input to the desired output. If such path is found, controller 36 transmits appropriate control signals to close the appropriate gates or switches in gating means 34 and complete the path. It is to be understood that originaion and destination address information can be transmitted on a separate common signaling channel from transceivers $10_1$ to $10_N$ and the external network. With such form of signaling arrangement, a separate signaling channel filter 38 and associated demodulator 39 would be required having its input from photo-detector 30. Similarly, the signaling information would have to be provided to controller 36 from the external network via a lead 40. Alternatively, the origination and destination address information could be transmitted in a preamble or postamble section of a packet of information as is well known in the art. With such arrangement, the outputs of demodulators $32_1$ to $32_N$ and the external network could be directly connected to controller 36 via lead or bus 40.

The outputs $35_1$ to $35_N$ from gating means 34 are coupled to Modulators $41_1$ to $41_N$, respectively. When modulators $41_1$ to $41_N$ are, for example, Voltage Tuned Oscillators (VTOs) they are responsive to separate associated DC voltage levels for modulating the input signal from gating means 34 into the frequency band of channels 1-N, respectively, in the manner described for VTO 20 in FIG. 3. More particularly, VTO $41_1$ generates the carrier frequency $\omega_1$ in response to a DC voltage level and modulates this carrier frequency with the input signal from output $35_1$ of gating means 34 to provide an output signal in the frequency band of channel 1. VTOs $41_2$ to $41_N$ function in a similar manner using carrier frequencies $\omega_2$ to $\omega_N$, respectively, to produce output signals in respective channels 2-N.

The individual channel 1-N output signals from VTOs $41_1$ to $41_N$ are combined in combiner 42 and the combined output signal is provided as an input signal to optical source 43. Optical source 43 can comprise any suitable semi-conductor laser or other means, as described hereinbefore for optical source 21 of FIG. 3, which is intensity modulated by the input signal from combiner 42. The output lightwave signal, including the combined information of channels 1-N is transmited along fiber 16. It is to be understood that although it is possible to combine all of the signals from VTOs $41_1$ to $41_N$ in a single combiner 42, it is also possible to combine subsections of these VTO outputs such as, for example, the outputs of VTOs $41_1$ to $41_2$ in combiner 42, and the outputs from VTOs $41_3$ to $41_N$ in a combiner 44. The outputs from combiners 42 and 44 can then be either combined as a single input to optical source 43, or the outputs from combiners 42 and 44 could be provided as separate inputs to optical source 43 and 45, respectively, with the output signals from optical sources 43 and 45 being combined in an optical combiner 46 for transmission on optical fiber 16 and/or free space link 19.

As shown in FIG. 1, the output channel signals from head-end network unit 15, propagating along optical fiber 16, reach optical couplers $17_1$ to $17_N$ in sequence. Each of couplers $17_i$ functions to direct a portion of the signal propagating along fiber 16 to receiver 12 of the associated transceiver $10_i$. A typical arrangement for a receiver 12 for the embodiment where each transceiver $10_1$ to $10_N$ is assigned a fixed separate one of the channels 1-N is shown in FIG. 6.

Figure 6:
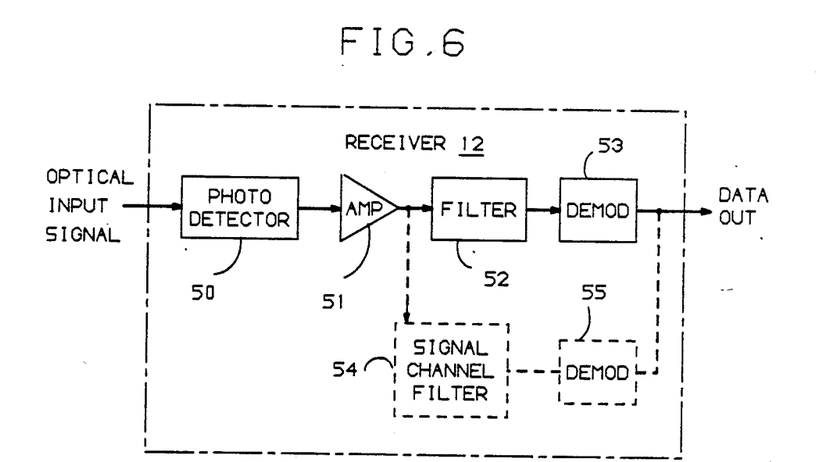
FIG. 6 is a block diagram of an exemplary receiver arrangement for a user of the system of FIG. 1 where each user is fixedly assigned a separate channel.

In the receiver of FIG. 6, the input signal from the associated optical coupler $17_i$ is received in a photodetector 50 which converts the lightwave signal of received channels 1-N into a corresponding electrical signal at the microwave frequency of the associated channels. The electrical output signal from photodetector 50 can be amplified to a proper level in amplifier 51 and applied to the input of a bandpass filter 52. Bandpass filter 52 functions to pass only the signals in the channel assigned to associated transceiver $10_i$ and reject all other channel signals. For example, for the exemplary case of trasnceiver $10_1$ being assigned to transmit and receive on channel 1, filter 52 of receiver 12 of transceiver $10_1$ would pass only the received frequency band of channel 1 and reject all other channel signals. The channel signal from filter 52 is passed through a demodulator 53 (e.g., a PLL or a limiter discriminator for use with FSK modulated signals) to convert the microwave electrical signals from filter 52 into a baseband digital signal for use by the associated user. Where, in al alternative embodiment, signaling is performed in a separate signaling channel from that of channels 1-N, then receiver 12 could also include a separate bandpass filter 54 which only passes the frequency band of the signaling channel and rejects all other, so that the signaling information can be sent to the associated user after passing through a separate demodulator 55.

Figure 7:
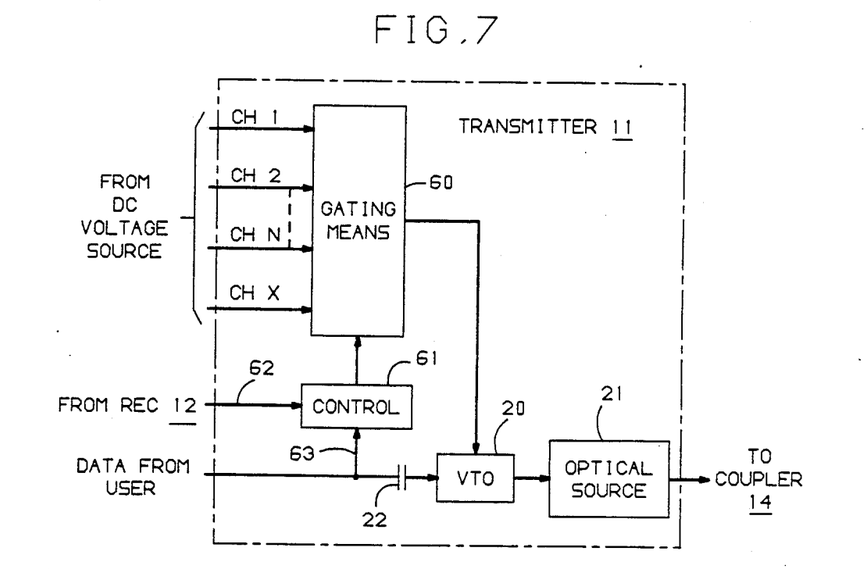
FIG. 7 is a block diagram of an exemplary transmitter arrangement for use in the system of FIG. 1 where the channels are selectively assigned to a user.

FIG. 7 is a block diagram of an exemplary arrangement of a transmitter 11 of FIG. 1 for the embodiment where the channels 1-N are selectively assignable. Transmiter 11 is shown as comprising a VTO 20, optical source 21, and a capacitance 22 which function in the manner described for corresponding components in FIG. 3. Transmitter 11 further comprises a gating means 60 and a controller 61. Gating means 60 functions to provide the appropriate DC control voltage to VTO 20 for the channel assigned to transmitter 11 under the control of controller 61. For example, if it is assumed that the system uses a separate channel for signaling purposes to head-end network unit 15, then an off-hook signal from the associated user is detected by controller 61 which closes gating means 60 to permit the DC control voltage that will generate the control channel (e.g., Channel X) in VTO 20 to be applied to VTO 20. The user then send the origination and destination address via VTO 20 and laser 21 to head-end network unit 15. At head-end network unit 15, its controller 36 receives the origination and destination addresses via photo detector 30, band-pass filter 38 and demodulator 39, and finds a free channel. This information is transmitted via fiber 16 to the receiver 12 associated with transmitter 11 and is received from receiver 12 in controller 61 of transmitter 12 via lead 62. Controller 61 then opens the path for the DC control voltage associated with the control channel and closes a path which will apply the DC control voltage to VTO 20 that will transmit the data information from the user in the assigned free channel. At the conclusion of a call, an on-hook signal in, for example, a preamble section of a transmission to head-end network unit 15, is also received by controller 61 from the user via lead 63 and is recognized as a termination control signal. In response thereto, controller 61 opens the path through gating means 60 for the DC control voltage used for the assigned transmission channel, and head-end network unit 15 releases its path through gating means 34 and updates its memory 37 to indicate both the free path and that the assigned channel is now free for subsequent assignment.

The arrangement of FIG. 7 is also usable in the arrangement of FIG. 1 where optional head-end unit 15 is not used, and optical fibers 13 and 16 are interconnected in a Local Area Network (LAN) arrangement. More particularly, in such LAN arrangement, each receiver 12 can be fixedly or selectively assigned to a separate one of channels 1-N, using, for example, the exemplary arrangement of FIG. 6 or FIG. 8. With such arrangement, a user desiring to communicate with a certain other user provides the appropriate destination address information to the associated controller 61 via lead 63. Based on the destination address provided, controller 61 causes the closing of the proper path through gating means 60 in order to apply the appropriate DC control voltage to VTO 20 for transmitting the information in the correct channel capable of being received by the receiver of the destined user over optical fibers 13 and then 16.

Figure 8:
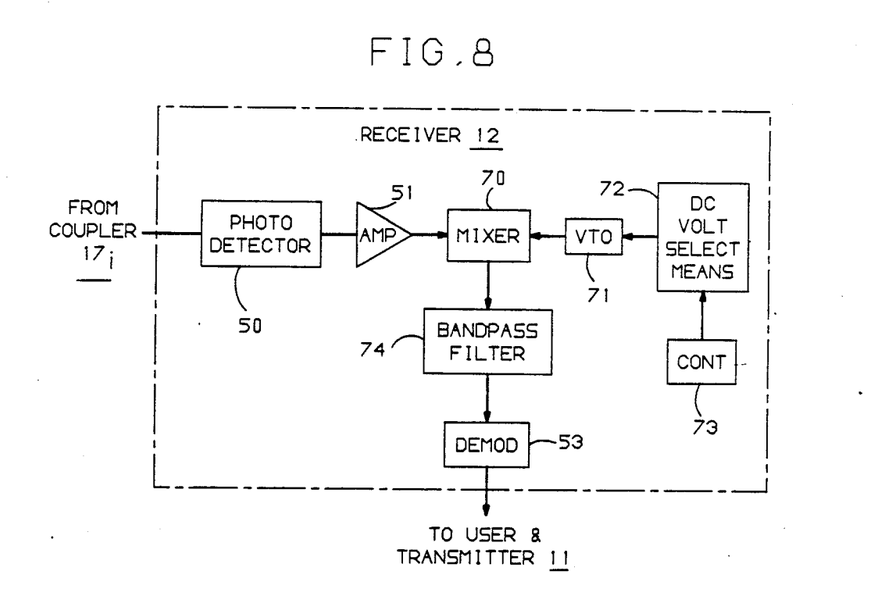
FIG. 8 is a block diagram of an exemplary receiver arrangement for the system of FIG. 1 where the channels are selectively assigned to, or chosen by, the associated user.

FIG. 8 is an alternative arrangement of receiver 12 wherein the input signal from coupler $17_i$ passes through photo detector 50 and amplifier 51, which function as described for the corresponding components of FIG. 6. The output signal from amplifier 51 is provided as a first input to a mixer 70. A second input to mixer 70 is provided by a VTO 71 whose output frequency is determined by the value of an input DC voltage. A DC voltage selecting means 72 selectiely provides any one of a plurality of 1-N (or 1-N and X) different DC control voltages to VTO 71 under the control of control means 73. More particularly, by selecting a predetermined one of 1-N DC voltage output values, VTO 71 will generate a corresponding output frequency with which Mixer 70 mixes the input signals from coupler $17_i$ and VTO 71 to generate an output signal where the desired channel is always within a predetermined passband. A fixed bandpass filter 74 only passes the predetermined passband which contains the desired channel. The desired channel signal is the demodulated in demodulator 53 for transmission to the associated user. For the alternative arrangement wherein head-end unit 15 transmits control signals on, for example, channel X for indicating to a user which channel is assigned to that user for communication, then during the period where such reception of channel X is indicated control means 73 can cause DC voltage selecting means 72 to generate a DC voltage for causing VTO 71 to generate the appropriate frequency for Channel X. The resultant control signal can then be passed through bandpass filter 74 and demodulator 53 to the associated transmitter 12 so that transmitter 12 transmits on the assigned channel.

An alternative embodiment of the optical communication system of FIG. 1 is shown in FIG. 9 which forms a broadcast system where the associated users, 1-N, are each capable of simultaneously receiving, for example, a plurality of K differet channel broadcasts and randomly selecting any one of the channels. As shown in FIG. 9, the broadcast system includes a head-end network unit 15 which receives the 1-K different program input signals and applies them as inputs to modulators $41_1$ to $41_K$ which can incude any suitable modulator but for purposes of explanation will be considered hereinafter as VTOs $41_1$ to $41_K$, respectively. Each VTO also has applied to its input a separate DC control voltage, such that VTOs $41_1$ to $41_K$ transmit on channels 1-k, respectively. The outputs from VTOs $41_1$ to $41_K$ are combined in combiner 42, and the combined signal is applied to optical source 43 for intensity modulating the optical source, as was described previously for the corresponding elements of FIG. 4. The output from optical source 43 is transmitted along optical fiber 16 and distributed to each of receivers 12, associated with a separate user 1-N, by optical couplers $17_1$ to $17_N$, as described hereinbefore for the corresponding elements of FIG. 1. As explained hereinbefore in FIG. 1, head-end network unit 15 could transmit the signal from combiner 42 via a free-space transmitter 80 and optical link $19_a$ to a user i. Each of receivers 12 has a configuration similar to that shown in FIG. 8, except that controller 74 can be manually or remotely controlled by the associated user to randomly select a particular channel of the K received channels, as might be found in a radio or television receiver.

What is claimed is:

1. An optical communication system comprising:
   a plurality of N transmitters each transmitter including means for (a) modulating an input electrical information signal from a separate associated group of at least one user into a predetermined channel signal disposed in a diffeent non-overlapping portion of a predetermined subcarrier frequency spectrum of the optical communication system from modulated channel signals produced by other active ones of the plurality of N transmitters, and then (b) converting the electrical channel signal into a representative lightwave channel output signal;
   a first lightguide for combining the lightwave channel output signals from each of the active transmitters to form a multiplexed signal and propagating the multiplexed signal therealong;
   a head-end unit including
   means for receiving the multiplexed signal propagating in the first lightguide and directing each of the received channel output signals in the multiplexed signal onto separate paths,
   demodulation means responsive to the separate channel signals from the receiving and directing means for demodulating each of the channel output signals into separate baseband electrical information output signals, and
   converting means for (a) modulating a separate one of a plurality of N different subcarrier signals with a separate baseband electrical information output signal from the demodulation means when the output signal is destined for any group of at least one user of the system to generate a separate channel signal, where N>1 and each channel signal includes the entire information signal to be received by a group of at least one user of the optical communication system and is disposed in a different non-overlapping portion of the predetermined subcarrier frequency spectrum of the communication system, (b) combining the individual channel signals to form a single multiplexed electrical output signal, and then (c) converting the multiplexed electrical output signal into a multiplexed lightwave output signal;
   a second lightguide for receiving and propagating therealong the multiplexed lightwave output signal from the head-end unit converting means; and
   a plurality of receivers, each receiver being associated with a separate group of at least one end user and comprising (1) photo detection means disposed to receive a predetermined proportional amount of the multiplexed lightwave output signal propagating in the second lightguide and convert the received multiplexed lightwave output signal into a corresponding electrical output signal, and (2) means for recovering from the electrical output signal a predetermined one of the multiplexed channel signals for transmission to an associated user while rejecting all other channel signals.

2. An optical communication system according to claim 1 wherein:
   the second lightguide comprises a plurality of optical couplers or free-space optics disposed at separate points along the second lightguide from the head-end unit converting means for coupling out a predetermined proportional amount of the multiplexed lightwave output signal propagating in the second lightguide for transmission to a separate one of the plurality of receivers.

3. An optical communication system according to claim 1 wherein the head-end unit converting means comprises:
   a plurality of modulators, each modulator being disposed to receive both (a) a separate one of the plurality of baseband electrical information output signals from the demodulation means, and (b) a separate predetermined DC voltage value for generating a subcarrier output channel signal forming a separate one of the corresponding plurality of non-overlapping subcarrier channel signals;
   means responsive to the subcarrier channel signals from the plurality of modulators for combining said output subcarrier channel signals into a single multiplexed electrical output signal; and
   an optical source for generating a carrier lightwave signal and intensity modulating said carrier lightwave signal in response to variations in the amplitude of the multiplexed electrical output signal from the combining means to generate the single multiplexed output lightwave signal.

4. An optical communication system according to claim 1 wherein:
   the lightguide comprises separate optical couplers or free-space optics disposed at separate points along the lightguide from the head-end unit converting means for coupling out a separate predetermined proportional amount of the lightwave signal propagating in the lightguide for transmission to a separate one of the plurality of receivers.

5. An optical communication system according to claim 1 wherein the recovering means of each receiver comprises:
   filtering means for passing only a desired subcarrier channel signal, of the plurality of subcarrier channel signals included in said electrical output signal from the photo detection means, to an output of the filtering means; and
   demodulation means responsive to the subcarrier channel signal at the output of the filtering means for converting the subcarrier channel signal into a baseband electrical output signal for transmission to the associated user group.

6. An optical communication system according to claim 5 wherein the filtering means comprises:
   a plurality of bandpass filters (71), each bandpass filter being arranged to pass a separate one of the plurality of channel signals in the representative electrical output signal from the photo detection means, to the demodulation means; and
   gating means (70) for selectively gating the representative electrical output signal from the photo detection means to any one of the plurality of bandpass filters.

7. An optical communication system comprising
   a plurality of transmitters each transmitter including (1) modulating means for selectively modulating a selected subcarrier signal with an input electrical information signal, received from a separate associated group of at least one user of the communication system, to place the electrical information signal into a selected subcarrier channel signal forming one of a plurality of N subcarrier channel signals, the selected subcarrier channel signal being arranged to include the entire information signal from the associated user group and lie in a separate non-overlapping portion of a predetermined system subcarrier frequency spectrum from that of the subcarrier channel signals from other transmitters which are currently active, and (2) an optical source for converting the selected subcarrier channel signal into a representative lightwave channel output signal which is then multiplexed with all other subcarrier channel output signals simultaneously transmitted by other active transmitters of the system;

lightwave propagating means for receiving and propagating the multiplexed lightwave output signal from the active ones of the plurality of transmitters; and a plurality of receivers, each receiver being associated with a separate group of at least one user and comprising (1) photo detection means disposed to receive the multiplexed lightwave output signal propagating in the lightwave propagating means and converting the multiplexed lightwave signal into a corresponding multiplexed electrical signal, and (2) means for demodulating the multiplexed electrical output signal to recover a predetermined one of the multiplexed subcarrier channel signals for transmission to an associated user while rejecting all other channel signals forming a part of the received multiplexed lightwave output signal.

* * * * *